United States Patent
Becker et al.

(10) Patent No.: US 10,882,371 B2
(45) Date of Patent: Jan. 5, 2021

(54) SINGLE-TUBE VIBRATION DAMPER AND DOME BEARING FOR MOTOR VEHICLES

(71) Applicants: THYSSENKRUPP BILSTEIN GMBH, Ennepetal (DE); thyssenkrupp AG, Essen (DE)

(72) Inventors: Matthias Becker, Fröndenberg (DE); Frank Sprenger, Hamm (DE); Peter Knueppel, Gevelsberg (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/097,930

(22) PCT Filed: May 15, 2017

(86) PCT No.: PCT/EP2017/061573
§ 371 (c)(1),
(2) Date: Oct. 31, 2018

(87) PCT Pub. No.: WO2017/198594
PCT Pub. Date: Nov. 23, 2017

(65) Prior Publication Data
US 2019/0143778 A1    May 16, 2019

(30) Foreign Application Priority Data
May 17, 2016    (DE) .................. 10 2016 208 418

(51) Int. Cl.
*B60G 13/00*    (2006.01)
*F16F 9/54*    (2006.01)
(Continued)

(52) U.S. Cl.
CPC ......... *B60G 13/003* (2013.01); *B60G 15/067* (2013.01); *F16F 9/54* (2013.01);
(Continued)

(58) Field of Classification Search
CPC ........ F16F 9/54; F16F 9/58; B60G 2204/128; B60G 2204/4502; B60G 13/003; B60G 15/067
See application file for complete search history.

(56) References Cited

U.S. PATENT DOCUMENTS 3,206,184 A * 9/1965 Walker ................. B60G 15/063
267/219
4,828,232 A * 5/1989 Harrod .................... F16F 9/084
188/322.12
(Continued)

FOREIGN PATENT DOCUMENTS

DE    38 40 352 A    6/1990
DE    68902943 T    5/1993
(Continued)

OTHER PUBLICATIONS

English Translation of International Search Report issued in PCT/EP2017/061573, dated Aug. 15, 2017 (dated Aug. 24, 2017).
(Continued)

*Primary Examiner* — Vishal R Sahni
(74) *Attorney, Agent, or Firm* — thyssenkrupp North America, LLC

(57) ABSTRACT

A single-tube oscillation damper for a motor vehicle may include a damper tube that is at least partially filled with damping fluid and in which a piston rod is movable back and forth, an operating piston that can be moved with the piston rod, and an end remote from the piston rod for bearing in a dome bearing. The end may include a transition region from an outer diameter of the damper tube to an outer diameter of the single-tube end remote from the piston rod. The end may also comprise a support region arranged in the transition region. The single-tube oscillation damper may further include a stop plate and at least one damping element. The
(Continued)

stop plate may be arranged on the support region, and the at least one damping element may be arranged on the stop plate at a side facing the end.

20 Claims, 1 Drawing Sheet

(51) Int. Cl.
   *F16F 9/58* (2006.01)
   *B60G 15/06* (2006.01)

(52) U.S. Cl.
   CPC .......... *F16F 9/58* (2013.01); *B60G 2204/128* (2013.01); *B60G 2204/4502* (2013.01)

(56) References Cited

U.S. PATENT DOCUMENTS

| | | | |
|---|---|---|---|
| 5,150,886 A | 9/1992 | Hamberg | |
| 5,265,902 A | 11/1993 | Lewis | |
| 5,544,725 A * | 8/1996 | Handke | B60G 15/063 |
| | | | 188/322.19 |
| 6,105,945 A * | 8/2000 | Takeuchi | B60G 13/008 |
| | | | 188/322.16 |
| 6,615,961 B2 * | 9/2003 | Komatsu | F16F 9/36 |
| | | | 188/297 |
| 9,162,548 B1 | 10/2015 | Wakeman | |
| 2015/0014907 A1 | 1/2015 | Reichmann | |

FOREIGN PATENT DOCUMENTS

| | | |
|---|---|---|
| DE | 44 09 661 C | 6/1995 |
| DE | 10 2007 020 136 A | 10/2008 |
| EP | 0160277 * | 11/1985 |
| EP | 1 842 701 A | 10/2007 |
| FR | 2 335 747 A | 7/1977 |
| WO | 030 20541 A | 3/2003 |

OTHER PUBLICATIONS

International Standard, DIN ISO 7619-1, Rubber, vulcanized or thermoplastic—Determination of indentation hardness—Part 1: Durometer Method (Shore hardness), Feb. 2012. [in the process of obtaining English translation].

International Standard ISO 3302-1, Rubber-Tolerances for products Part 1: Dimensional tolerances, Second edition Jul. 15, 2014. [English translation].

International Standard, ISO 7619-1, "Rubber, vulcanized or thermoplastic—Determination of indentation hardness—Part 1: Durometer Method (Shore hardness)", Second Edition, (Oct. 1, 2010).

* cited by examiner

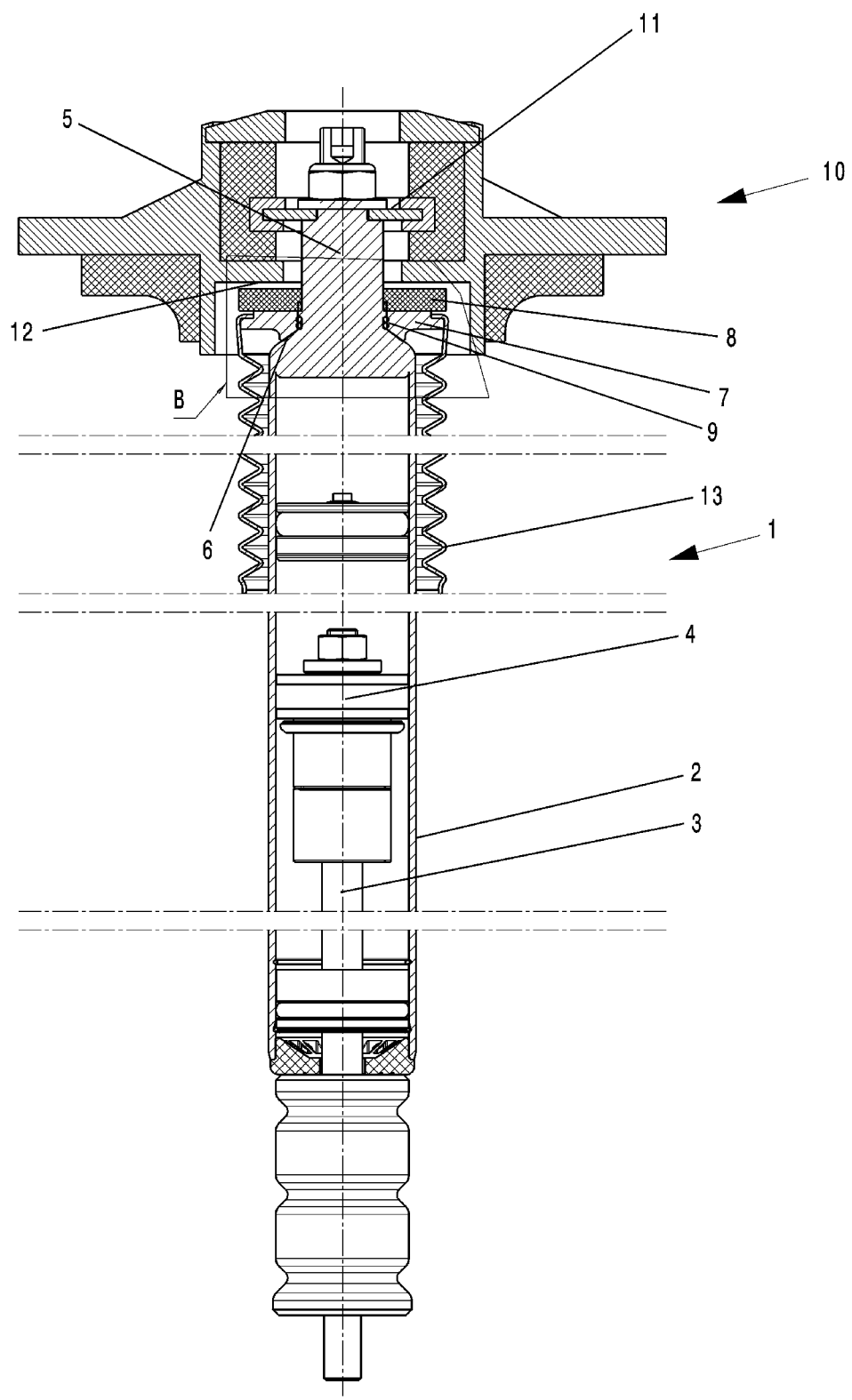

SINGLE-TUBE VIBRATION DAMPER AND DOME BEARING FOR MOTOR VEHICLES

CROSS REFERENCE TO RELATED APPLICATIONS

This application is a U.S. National Stage Entry of International Patent Application Serial No. PCT/EP2017/061573 filed May 15, 2017, which claims priority to German Patent Application No. DE 10 2016 208 418.6, filed May 17, 2016, the entire contents of both of which are incorporated herein by reference.

FIELD

The present disclosure generally relates to dampers, including single-tube oscillation dampers and dome bearing arrangements for motor vehicles.

BACKGROUND

Single-tube oscillation dampers and dome bearing arrangements for motor vehicles are known in the prior art in a large number of embodiments.

A single-tube oscillation damper, in particular also single-tube damper, comprises a damper tube, also called an operating cylinder, an operating piston and a separation piston. The separation piston separates oil and gas from each other in the damper tube. As a result of this gas cushion, single-tube oscillation dampers are, for example, also referred to as gas dampers. The gas chamber is used for volume and temperature compensation. As a result of the separation of oil and gas space, the installation position may be freely selected, such as, for example, an upside-down installation. In the single-tube principle the movable separation piston when the piston rod is introduced (pressure stage) compresses the gas cushion by the oil volume corresponding to the piston rod and when the piston rod is removed (traction step), the nitrogen gas presses the separation piston back again. The damping of the oscillation is carried out in both directions via the operating piston, which in particular comprises a multi-stage piston valve. In contrast to the dual-tube damper, the single-tube embodiment has no additional coaxially arranged container tube.

A dome bearing, in particular also referred to as a suspension strut bearing, is a component of the chassis of motor vehicles. It is located above the spring on the suspension strut. The dome bearing connects the suspension strut, comprising the oscillation damper, to the bodywork. In addition, dome bearings are an important construction element of the axle suspension and contribute to producing an optimum contact between tires and road surface. Furthermore, dome bearings increase the comfort by insulating rolling and road noises from the bodywork.

A dome bearing for dual-tube dampers is known from EP 1 842 701 A1.

The problem with the embodiments known in the prior art is that, during travel operation of the motor vehicle, rolling and road noises from the bodywork are not adequately insulated so that often disruptive impact and/or squeaking noises occur. Furthermore, a worsening of the travel properties, as a result of the significant introduction of force can be determined, wherein the damping forces and buffering noises introduced into the dome bearing accumulate. In particular, this change can be attributed to the comfortable configuration of standard dome bearings.

Thus a need exists for an improved single-tube oscillation damper and/or improved dome bearing arrangement, with a travel behavior that is without disruptive impact and/or squeaking noises, and with noise suppression. Furthermore, during travel operation, a more direct, more compact and more sporty driving impression is provided.

BRIEF DESCRIPTION OF THE FIGURE

FIG. 1 is a schematic longitudinal sectional view through an example single-tube oscillation damper and a dome bearing.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The single-tube oscillation damper according to the invention comprises compared with conventional single-tube oscillation dampers the advantage that an optimized force introduction into the dome bearing is carried out, wherein in particular the travel properties improve and, for example, direct driving experience is produced.

The dome bearing according to the invention comprises compared with conventional dome bearing arrangements the advantage that an optimized introduction of force is carried out into the dome bearing, wherein the dome bearing is relieved of loads and force/tension peaks, for example, when travelling through a pothole, can be minimized.

The single-tube oscillation damper according to the invention for a motor vehicle comprises
- a damper tube which is at least partially filled with damping fluid and in which a piston rod can be moved back and forth, wherein an operating piston can also be moved with the piston rod,
- an end of the single-tube oscillation damper remote from the piston rod for bearing in a dome bearing, wherein the end of the single-tube oscillation damper remote from the piston rod comprises a transition region from the outer diameter of the damper tube to the outer diameter of the end of the single-tube oscillation damper remote from the piston rod, wherein the end of the single-tube oscillation damper remote from the piston rod comprises a support region which is arranged in the transition region and the single-tube oscillation damper in addition comprises a stop plate and at least one damping element, wherein the stop plate is arranged on the support region and the at least one damping element is arranged on the stop plate at the side facing the end of the single-tube oscillation damper remote from the piston rod.

Another aspect of subject-matter of the invention is a dome bearing for bearing the end of a single-tube oscillation damper remote from the piston rod for a motor vehicle in the dome bearing, wherein the dome bearing comprises a securing device for securing the end of the single-tube oscillation damper remote from the piston rod in the dome bearing in a resiliently borne manner and a stop face, wherein the at least one damping element is arranged on the stop plate of the single-tube oscillation damper at the side facing the end of the single-tube oscillation damper remote from the piston rod and the stop face is arranged for striking the at least one damping element at the side opposite the damping element.

In a preferred embodiment of the invention, the dome bearing is a three-path dome bearing.

In the context of the present invention, the term three-path is intended to refer to a bearing in three paths. For example, a first path is the bearing of a spring, in particular of a helical spring, on a spring plate receiving member which is arranged on the dome bearing. For example, a second path is the bearing, in particular a resilient bearing, of a suspension strut end in the dome bearing. For example, a third path is the bearing of a pressure stop spring with an end on a stop in the dome bearing. In accordance with a force-specific differentiation, a three-path dome bearing has, for example, the specific feature that the three distinguishable forces: damping forces, pressure impact forces and resilient forces, which occur in particular with a MacPherson axle suspension strut are introduced into the dome bearing in a decentralized manner. In particular, the damping forces are introduced via the head bearing, the pressure impact forces via the impact surface of the dome bearing and the resilient forces via the spring bearing.

In a preferred embodiment of the invention, the single-tube oscillation damper is arranged in an upside-down position in a motor vehicle.

A transition region in the context of the present invention is, for example, selected from a shoulder, a flank, a spring ring, a chamfer, an inclination, a trapezoidal transition or combination thereof.

A damping element is in the context of the present invention intended to be understood to be an element which transmits forces which are transmitted from the stop plate arranged on the damping element in a damped manner to a stop face of the dome bearing. Furthermore, the damping element can during travel operation of the motor vehicle insulate rolling and road noises with respect to the bodywork. For example, a damping element may be selected from a ring, a plate, a hollow cylinder, a truncated cone, a molded component, which comprises a bead on the stop side, or a combination thereof. The material of the damping element is, for example, rubber, caoutchouc, polymers, in particular polyurethane, TPE, NBR, SBR, EPDM, NR, rubber/metal compounds and the composition or combinations thereof.

In a preferred embodiment of the invention, the end of the single-tube oscillation damper remote from the piston rod comprises a smaller outer diameter compared with the damper tube.

According to another embodiment of the invention, the end of the single-tube oscillation damper remote from the piston rod additionally comprises at least one fixing element, in particular an O-ring, wherein the fixing element is arranged in a region between the stop plate and the end of the single-tube oscillation damper remote from the piston rod.

In the context of the present invention, a fixing element is understood to be an element which fixes the stop plate with respect to the end of the single-tube oscillation damper remote from the piston rod. Furthermore, the damping element may during travel operation of the motor vehicle insulate rolling and road noises with respect to the bodywork. For example, fixing elements are selected from the group of profile rings, in particular O-rings, flat rings or combinations thereof.

The material of the fixing element is, for example, rubber, caoutchouc, polymers, in particular polyurethane, and the composition and combinations thereof.

According to another embodiment of the invention, the stop plate comprises at least one geometric surface structure for receiving and at least positive-locking positioning of the at least one damping element on the stop plate.

In the context of the present invention, a geometric surface structure is intended to be understood to be a structure of the surface of the stop plate which enables the introduction of forces into the at least one damping element. For example, a geometric surface structure may be a chamfer which is fitted to the stop plate, in particular a chamfer which is arranged at right-angles or at an angle, or a combination thereof.

According to another embodiment of the invention, the stop plate comprises at least one receiving device for a protective sleeve, in particular a chamfer in an edge region of the stop plate, wherein at least one protective sleeve is additionally arranged on the at least one chamfer. A receiving device for a protective sleeve is in the context of the present invention intended to be understood to be a device which retains a protective sleeve in a secure and stable manner. For example, a receiving device for a protective sleeve may be a chamfer, a shoulder, a groove contour, a turned portion or a combination thereof.

In the context of the present invention, a protective sleeve is intended to be understood to be a protection device in particular against dirt and impact from stones with a sleeve like geometry. Exemplary embodiments of a protective sleeve may be a protective tube, in particular with a planar covering face, a bellows or a combination thereof.

In another embodiment of the invention, the at least one damping element comprises a thickness in the range from 0.1 to 80 mm, preferably in the range from 0.5 to 10 mm, in a particularly preferred manner in the range from 1 to 8 mm, quite particularly preferably in the range from 1.5 to 4 mm.

According to another embodiment of the invention, the at least one damping element comprises a hardness in a range from 40 to 90 Shore in accordance with DIN ISO 7619-1, February 2012. The geometric dimensional inspection, in particular dimensional deviation is determined in accordance with DIN ISO 3302 from the year October 1999.

According to another embodiment of the invention, the at least one damping element is at least partially connected to the stop plate in a materially integral manner. A materially integral connection is, for example, an adhesive bonding, welding, vulcanization.

According to another embodiment of the dome bearing according to the invention, the at least one stop face for striking the at least one damping element is arranged in a construction position with spacing from the at least one damping element, in particular has a spacing of less than or equal to 15 mm, preferably less than 6 mm, in a particularly preferred manner less than 4 mm, quite particularly preferably less than 2 mm.

A dome bearing arrangement is in the context of the present invention also intended to be understood to be a dome bearing. In the context of the present invention, a construction position is intended to be understood to be the spacing between the bodywork and an even substrate on which a vehicle is standing, in particular a roadway, wherein the vehicle is standing on the even substrate without any loading and the manufacturer-specific tire pressure is adjusted in the tires of the vehicle.

FIG. 1 is a longitudinal section through a single-tube oscillation damper 1 and a dome bearing 10 according to an embodiment of the invention. The single-tube oscillation damper 1 comprises a damper tube 2 in which a piston rod 3 is arranged so as to be able to be moved back and forth, wherein an operating piston 4 can also be moved with the piston rod 3. The operating piston 4 divides the inner space of the damper tube 2 into a piston-rod-side operating chamber and an operating chamber remote from the piston rod. In addition, an end 5 of the single-tube oscillation damper 1 remote from the piston rod having a transition region from the outer diameter of the damper tube 2 to the outer diameter of the end 5 of the single-tube oscillation damper 1 remote from the piston rod is illustrated. The end 5 of the single-tube oscillation damper 1 remote from the piston rod comprises a support region 6 which is arranged in the transition region, a stop plate 7 and a damping element 8. The stop plate 7 is illustrated in a state arranged on the support region 6. The damping element 8 is illustrated in a state arranged on the stop plate 7 at the side facing the end of the single-tube oscillation damper remote from the piston rod. The stop plate 7 comprises in the edge region, for example, a receiving device for a protective sleeve 13, illustrated as a chamfer, on which the protective sleeve 13, as illustrated, is arranged. In the region between the stop plate 7 and the end 5 of the single-tube oscillation damper 1 remote from the piston rod, a fixing element 9, illustrated, for example, as an O-ring, is arranged. The dome bearing 10 for bearing the end 5 of the single-tube oscillation damper 1 remote from the piston rod comprises a securing device 11 for securing the end 5 of the single-tube oscillation damper 1 remote from the piston rod in a borne manner in the dome bearing 10 and a stop face 12. The damping element 8 is illustrated with spacing from the stop face 12, which corresponds to the non-travel operation of the motor vehicle, in particular of the construction position of the motor vehicle.

INDUSTRIAL APPLICABILITY

Single-tube oscillation dampers and dome bearings of the type described above for vehicles are used in the production of vehicles, in particular of chassis of motor vehicles.

LIST OF REFERENCE NUMERALS

1=Single-tube oscillation damper
2=Damper tube
3=Piston rod
4=Operating piston
5=End of the single-tube oscillation damper remote from the piston rod
6=Support region
7=Stop plate
8=Damping element
9=Fixing element
10=Dome bearing
11=Securing device
12=Stop face
13=Protective sleeve

What is claimed is:

1. A single-tube oscillation damper for a motor vehicle, the single-tube oscillation damper comprising:
a damper tube that extends along a longitudinal axis and is at least partially filled with damping fluid, wherein a piston rod is movable back and forth in the damper tube, wherein an operating piston is movable with the piston rod;
an end remote from the piston rod for bearing in a dome bearing, wherein the end comprises:
a first portion and a second portion, the first portion being longitudinally closer to the damper tube than the second portion, wherein the first and second portions have different outer diameters,
a transition region from an outer diameter of the damper tube to the outer diameter of the second portion, and
a support region disposed in the transition region;
a stop plate disposed on the support region;
a damping element disposed on the stop plate at a side facing the end; and
a fixing element disposed radially between an innermost opening of the stop plate and the end in a plane that is orthogonal to the longitudinal axis.

2. The single-tube oscillation damper of claim 1 wherein the outer diameter of the second portion of the end is smaller than the outer diameter of the damper tube.

3. The single-tube oscillation damper of claim 1 wherein the fixing element comprises an O-ring.

4. The single-tube oscillation damper of claim 1 wherein the stop plate comprises a geometric surface structure for receiving and positive-locking positioning the damping element on the stop plate.

5. The single-tube oscillation damper of claim 4 wherein the stop plate comprises a receiving device for a protective sleeve, the protective sleeve being disposed on the receiving device.

6. The single-tube oscillation damper of claim 5 wherein the receiving device is a chamfer disposed in an edge region of the stop plate.

7. The single-tube oscillation damper of claim 1 wherein the transition region of the end is disposed longitudinally beyond the damper tube.

8. The single-tube oscillation damper of claim 1 wherein the damping element comprises a thickness in a range of 1.5 to 4 mm.

9. The single-tube oscillation damper of claim 1 wherein the damping element has a hardness in a range of 40 to 90 Shore in accordance with DIN ISO 7619-1 of February 2012.

10. The single-tube oscillation damper of claim 1 wherein the damping element is at least partially connected to the stop plate in a materially integral manner.

11. The dome bearing as recited in claim 1 for bearing the end of the single-tube oscillation damper remote from the piston rod, the dome bearing comprising:
a securing device for securing the end in a resiliently borne manner; and
a stop face arranged for striking the damping element at a side opposite the damping element, wherein the stop face is configured to be spaced apart from the damping element while the single-tube oscillation damper is at rest, wherein the stop face is configured to contact the damping element while the single-tube oscillation damper is in operation.

12. The dome bearing of claim 11 wherein the stop face is disposed in a construction position spaced apart from the damping element.

13. The dome bearing of claim 12 wherein the stop face is spaced apart, up to 15 mm, from the damping element while the single-tube oscillation damper is at rest.

14. The dome bearing of claim 12 wherein the stop face is spaced apart, up to 6 mm, from the damping element while the single-tube oscillation damper is at rest.

15. The dome bearing of claim 12 wherein the stop face is spaced apart, up to 4 mm, from the damping element while the single-tube oscillation damper is at rest.

16. The dome bearing of claim 12 wherein the stop face is spaced apart, up to 2 mm, from the damping element while the single-tube oscillation damper is at rest.

17. A single-tube oscillation damper for a motor vehicle, the single-tube oscillation damper comprising:
a damper tube that extends in a longitudinal direction and is at least partially filled with damping fluid, wherein a piston rod is movable back and forth in the damper tube, wherein an operating piston is movable with the piston rod;
an end remote from the piston rod for bearing in a dome bearing, wherein the end comprises:
a first portion and a second portion, the first portion being longitudinally closer to the damper tube than the second portion, wherein the first and second portions have different outer diameters,
a transition region from an outer diameter of the damper tube to the outer diameter of the second portion, and
a support region disposed in the transition region;
a stop plate disposed on the support region; and
a damping element disposed on the stop plate at a side facing the end, the damping element being disposed within the dome bearing such that the dome bearing extends along an entire longitudinal length of the damping element radially exterior to the damping element.

18. The single-tube oscillation damper of claim 17 wherein the stop plate is disposed within the dome bearing.

19. The single-tube oscillation damper of claim 17 wherein the transition region is disposed between the damping element and a side of the dome bearing that faces the damper tube.

20. A single-tube oscillation damper for a motor vehicle, the single-tube oscillation damper comprising:
a damper tube that is at least partially filled with damping fluid, wherein a piston rod is movable back and forth in the damper tube, wherein an operating piston is movable with the piston rod;
an end remote from the piston rod for bearing in a dome bearing, wherein the end comprises:
a first portion and a second portion, the first portion being longitudinally closer to the damper tube than the second portion, wherein the first and second portions have different outer diameters,
a transition region from an outer diameter of the damper tube to the outer diameter of the second portion, and
a support region disposed in the transition region;
a stop plate disposed on the support region; and
a damping element disposed on the stop plate at a side facing the end, the damping element being disposed within the dome bearing, wherein the damping element is configured to be spaced apart from a stop face of the dome bearing while the single-tube oscillation damper is at rest, wherein the damping element is configured to contact the stop face of the dome bearing while the single-tube oscillation damper is in operation.

* * * * *